(12) United States Patent
Ito et al.

(10) Patent No.: US 11,788,996 B2
(45) Date of Patent: Oct. 17, 2023

(54) DATA PROCESSING DEVICE FOR CHROMATOGRAPH, DATA PROCESSING METHOD, AND CHROMATOGRAPH

(71) Applicant: HITACHI HIGH-TECH SCIENCE CORPORATION, Tokyo (JP)

(72) Inventors: Masahito Ito, Tokyo (JP); Masato Fukuda, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 680 days.

(21) Appl. No.: 16/739,024

(22) Filed: Jan. 9, 2020

(65) Prior Publication Data
US 2020/0300823 A1   Sep. 24, 2020

(30) Foreign Application Priority Data

Mar. 20, 2019 (JP) .................................. 2019-053584

(51) Int. Cl.
*G01N 30/86* (2006.01)
*G01N 30/88* (2006.01)

(52) U.S. Cl.
CPC ..... *G01N 30/8631* (2013.01); *G01N 30/8641* (2013.01); *G01N 30/8651* (2013.01); *G01N 30/8675* (2013.01); *G01N 30/88* (2013.01); *G01N 2030/8804* (2013.01)

(58) Field of Classification Search
CPC ........... G01N 30/8631; G01N 30/8641; G01N 30/8651; G01N 30/8675; G01N 30/88; G01N 2030/8804; G01N 2030/862; G01N 30/8603; G01N 30/02; G01N 30/86; G01N 30/861
See application file for complete search history.

(56) References Cited

U.S. PATENT DOCUMENTS 10,088,460 B2 * 10/2018 DeWitte ............. G01N 30/8658
2002/0119456 A1 * 8/2002 Ness ...................... C07H 21/04
435/6.12

(Continued)

FOREIGN PATENT DOCUMENTS

JP        S57-069253 A      4/1982
JP        2003-194795 A     7/2003

(Continued)

OTHER PUBLICATIONS

Japanese Patent Office, "Notice of Reasons for Refusal," issued in connection with Japanese Patent Application No. 2019-053584, dated Oct. 31, 2022 (8 pages).

*Primary Examiner* — David A Vanore
(74) *Attorney, Agent, or Firm* — Holland & Hart LLP (57) ABSTRACT

To reduce an arithmetic processing load or an influence of noise at the time of virtual curve calculation processing, provided is a data processing device for a chromatograph, which is configured to execute data processing based on plot data measured by using a chromatograph, the data processing device including a virtual curve calculation data generator configured to obtain a smaller number of pieces of virtual curve calculation data than a number of pieces of the measured plot data; and an arithmetic processor (163) functioning as a virtual curve calculator configured to obtain a virtual curve based on the virtual curve calculation data.

7 Claims, 7 Drawing Sheets

(56) References Cited

U.S. PATENT DOCUMENTS

| | | | |
|---|---|---|---|
| 2006/0057566 A1* | 3/2006 | Van Ness | C12Q 1/6825 |
| | | | 435/6.12 |
| 2006/0070954 A1* | 4/2006 | Marfosella | C07K 1/20 |
| | | | 435/7.1 |
| 2015/0066388 A1* | 3/2015 | Katsuyama | G01N 30/8658 |
| | | | 702/31 |
| 2015/0233875 A1* | 8/2015 | Takahashi | G01N 30/88 |
| | | | 73/61.53 |
| 2017/0010213 A1* | 1/2017 | Jingu | G01N 30/74 |
| 2018/0052140 A1* | 2/2018 | Yokoi | G01N 35/00871 |
| 2018/0093201 A1* | 4/2018 | Yokoi | B01D 15/22 |
| 2018/0136175 A1* | 5/2018 | Nakashima | G01N 30/8644 |
| 2021/0148869 A1* | 5/2021 | Yokoi | G01N 30/24 |

FOREIGN PATENT DOCUMENTS

| | | | | |
|---|---|---|---|---|
| JP | 2006177980 A | | 7/2006 | |
| WO | WO-2012035879 A1 | * | 3/2012 | E05B 47/026 |
| WO | WO-2014030537 A1 | * | 2/2014 | G01N 30/86 |

* cited by examiner

DATA PROCESSING DEVICE FOR CHROMATOGRAPH, DATA PROCESSING METHOD, AND CHROMATOGRAPH

The present application claims priority to Japanese Patent Application No. 2019-053584, filed Mar. 20, 2019, the entire contents of which is incorporated herein for all purposes by this reference.

BACKGROUND OF THE INVENTION

1. Field of the Invention

The present invention relates to a chromatography technology, for example, a liquid chromatograph, and more particularly, to a data processing device for a chromatograph, a data processing method, and a chromatograph.

2. Description of the Related Art

In a chromatograph, the type, amount, and other values of a component contained in a sample to be analyzed are obtained based on waveform data in which the horizontal axis represents time and the vertical axis represents a signal intensity. At this time, characteristic points, such as a start point at which the signal intensity rises and an end point at which the signal intensity falls, are detected and subjected to waveform processing, based on data detected by an apparatus. Specifically, a characteristic point, for example, the start point, is detected by executing virtual curve calculation processing (curve fitting), for example, a Gaussian function, by using a nonlinear least-squares method or another method (e.g., refer to Japanese Patent Application Laid-open No. 2006-177980).

When curve fitting, for example, the Gaussian function, or another function is executed by using the nonlinear least-squares method as described above, and there are a small number of plots, the obtained curve has a large possibility of not fitting an actual waveform. On the contrary, when there are a large number of plots, the arithmetic processing load of the virtual curve calculation processing (curve fitting) is large. Further, the obtained curve may adversely have a large possibility of deviating from the actual waveform due to an influence of noise.

SUMMARY OF THE INVENTION

The present invention has been made in view of the above-mentioned points, and has an object to easily achieve, for example, reduction in arithmetic processing load of virtual curve calculation processing and an influence of noise.

In order to achieve the above-mentioned object, according to at least one embodiment of the present invention, there is provided a data processing device for a chromatograph, which is configured to execute data processing based on plot data measured by using the chromatograph, the data processing device including: a virtual curve calculation data generator configured to obtain a smaller number of pieces of virtual curve calculation data than a number of pieces of the measured plot data; and a virtual curve calculator configured to obtain a virtual curve based on the virtual curve calculation data.

With this configuration, it is possible to keep the number of pieces of data at the time of obtaining the virtual curve to a small number, and thus it is possible to easily achieve reduction in the arithmetic processing load and the influence of the noise, for example.

According to at least one embodiment of the present invention, it is possible to easily achieve, for example, reduction in arithmetic processing load of the virtual curve calculation processing and the influence of the noise.

DESCRIPTION OF THE EMBODIMENTS

Now, a description is given in detail of at least one embodiment of the present invention with reference to the drawings.

(Configuration of Liquid Chromatograph 100)

Figure 1:
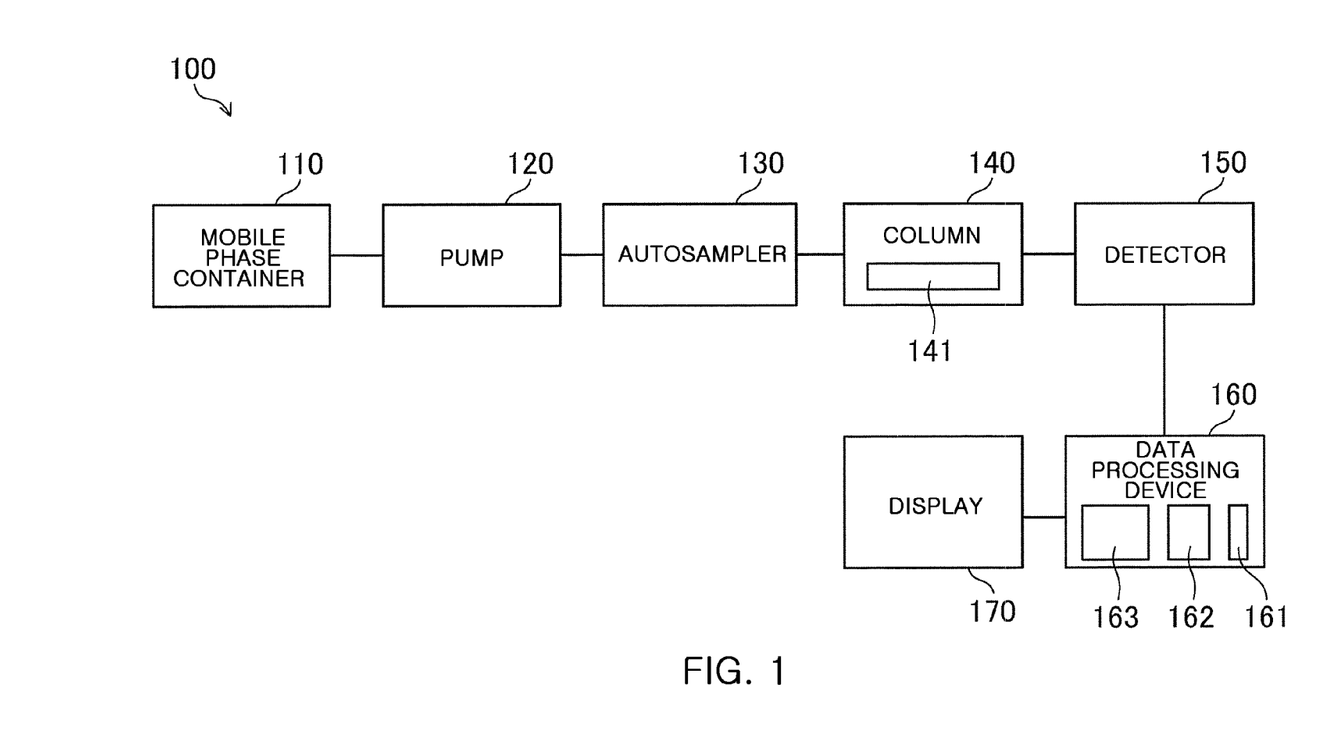
FIG. 1 is a block diagram for illustrating a schematic configuration of a chromatograph.

FIG. 1 is an illustration of a schematic configuration of a liquid chromatograph 100. The liquid chromatograph 100 includes a mobile phase container 110 configured to store liquid being a mobile phase, a pump 120 configured to transfer the mobile phase, an autosampler 130 configured to inject a sample, a column 141 having a constant temperature kept by a column oven 140, which is configured to separate components in the sample, a detector 150 configured to detect separated components, a data processing device 160 configured to process a detection result, and a display 170 configured to display a processing result. Each component of the liquid chromatograph 100 can be configured similarly to a general apparatus except mainly for the details of processing by the data processing device 160, and thus a detailed description thereof is omitted herein.

(Detailed Configuration of Data Processing Device 160)

Figure 2:
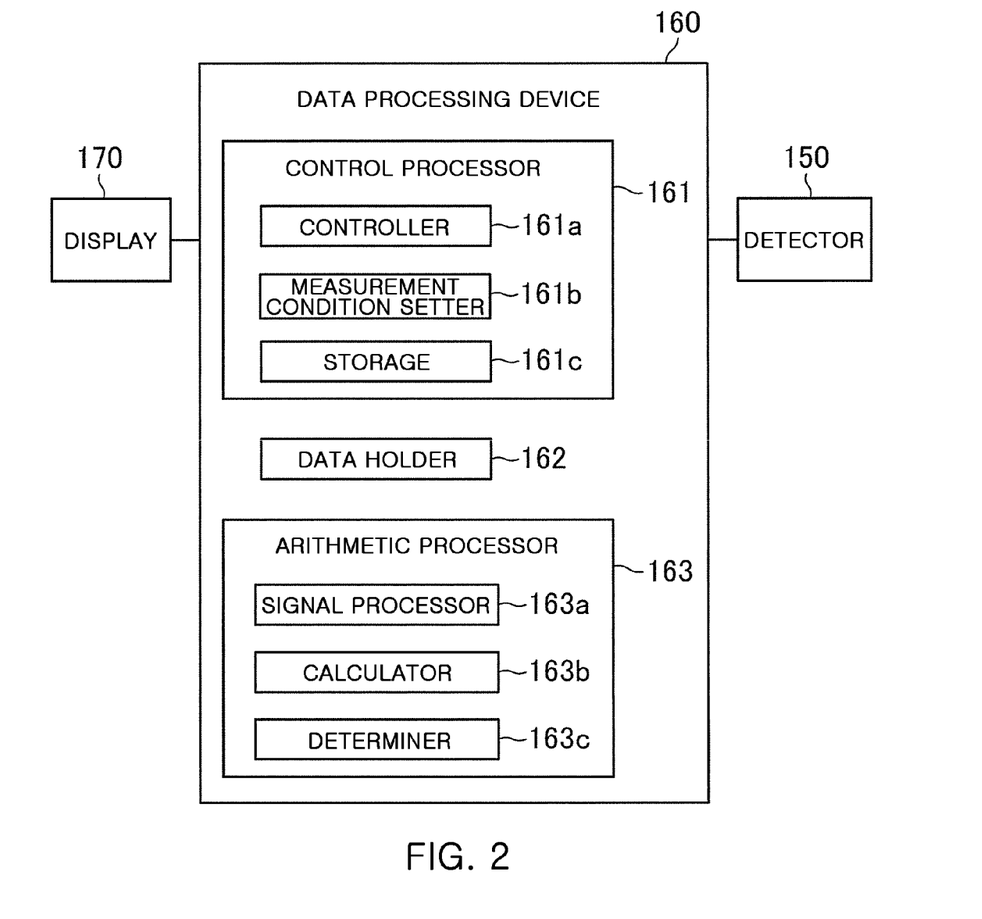
FIG. 2 is a block diagram for illustrating a schematic configuration of a data processing device for the chromatograph.

As illustrated in FIG. 2, the data processing device 160 described above includes a control processor 161, a data holder 162, and an arithmetic processor 163.

The control processor 161 is configured to control the operation of the entire liquid chromatograph 100. A controller 161a, a measurement condition setter 161b configured to set a measurement condition in accordance with an operation of an operation panel (not shown), for example, and a storage 161c configured to store a measurement result, for example, are provided in the control processor 161.

The data holder 162 holds, for example, data processed based on the measurement result.

The arithmetic processor 163 is configured to execute processing based on the measurement result, and functions as a virtual curve calculation data generator, a virtual curve calculator, a provisional start/end point calculator, a provisional characteristic point obtaining module, and an actual plot data characteristic point extractor. Specifically, for example, the arithmetic processor 163 includes a signal processor 163a configured to subject an analog signal output from the detector 150 to D/A conversion, for example, a calculator 163b configured to execute extraction or analysis of a characteristic point, for example, and a determiner 163c configured to determine an analysis result, for example.

(Data Processing Operation)

Figure 3:
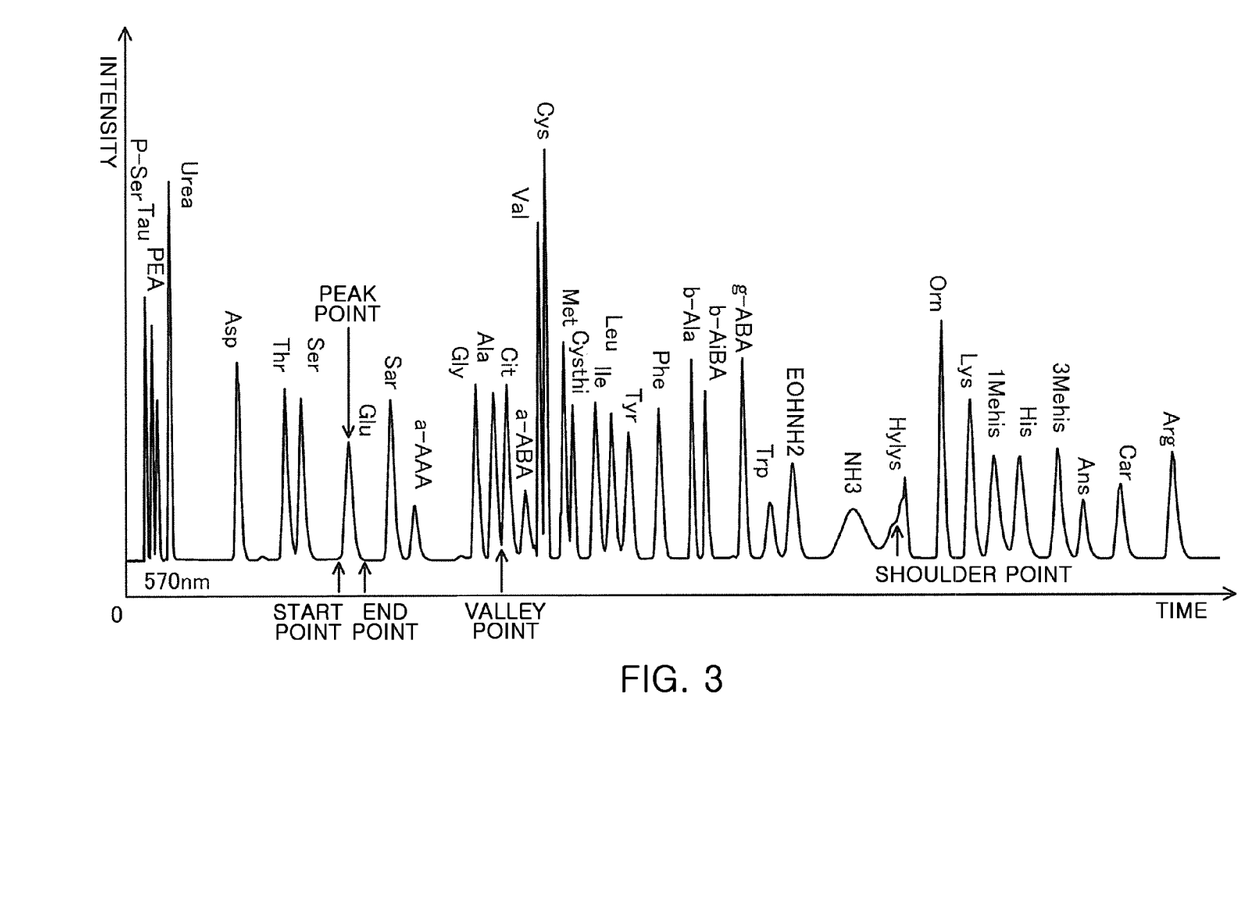
FIG. 3 is a graph for showing an example of a chromatogram.

The liquid chromatograph 100 described above obtains such waveform data as shown in FIG. 3, for example, by a measurement operation. This waveform data is waveform data in which the horizontal axis represents time and the vertical axis represents a signal intensity. A relationship between time and a component is known in advance, and thus a holding time of a peak point on the horizontal axis of the waveform data is used to identify a component contained in a sample to be analyzed (qualitative processing). Further, the amount of substance of the component is calculated based on a peak area of the waveform data (quantitative calculation processing). Those kinds of processing are executed by extracting characteristic points such as a peak point, a start point, an end point, a valley point, and a shoulder point as shown in a representative example of FIG. 3 or setting a baseline segment based on those characteristic points.

Figure 4:
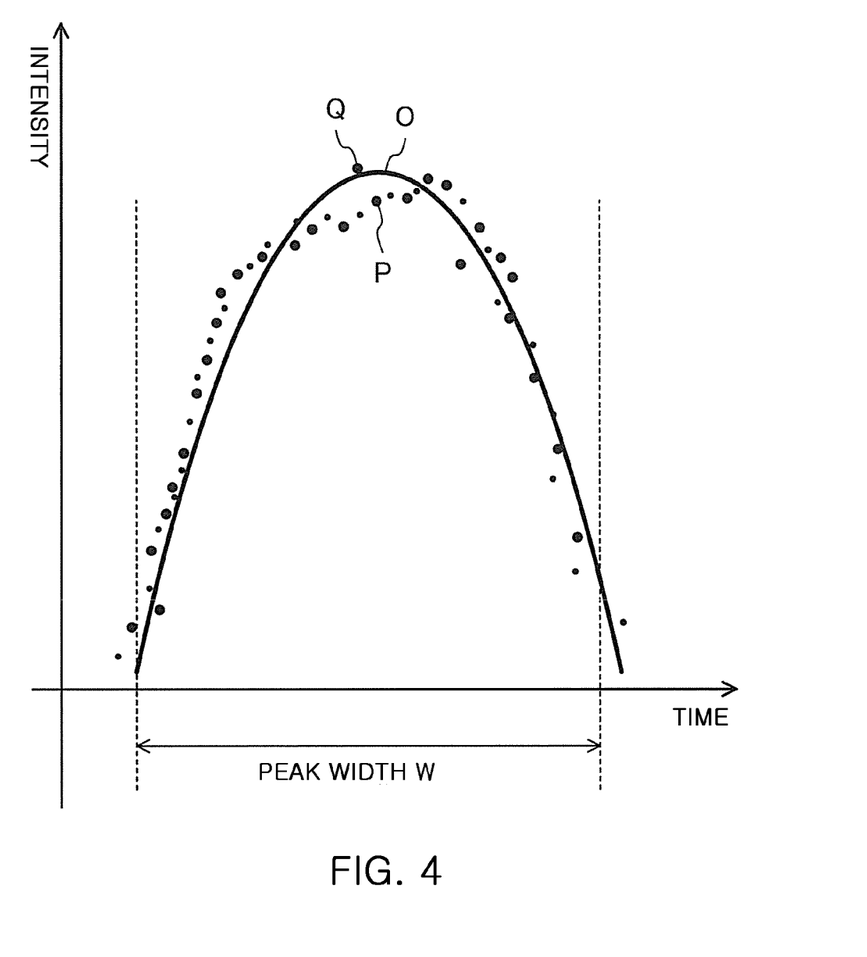
FIG. 4 is an explanatory graph for showing an example of extraction of characteristic points.

In the case of extraction of a peak point as an example, the above-mentioned characteristic points are extracted by the processing of the arithmetic processor 163 in the following manner and as shown in FIG. 4.

(Data Processing Operation-Bunching Processing)

First, when a sampling period of the detector 150 is short and the number of pieces of plot data, which is discrete data actually detected within the range of a peak width w, is large, for example, 65 points or larger, bunching of converting a plurality of pieces of plot data into virtual curve calculation data of, for example, 64 points or less with respect to a time axis, or preliminary processing of smoothing a group of measured points by a Savitzky-Golay method or other methods is executed, for example.

The above-mentioned bunching processing basically involves simply performing addition for every two points or performing addition for every three points, for example. However, depending on the data processing device, data points may not be arranged at equal time intervals, and bunching processing suitable for that case is required. For example, when addition for every four points at a sampling period of 400 ms (bunching of 1,600 ms) is changed to addition at a sampling period of twice the sampling period of 400 ms, namely, 800 ms, the bunching processing is considered to be set to bunching processing of performing addition for every two points after that. In this case, the input peak width is a peak width imagined by the user. A shoulder peak may inevitably be a superimposition of two peaks, or a double peak may inevitably look like a single peak having a wide peak width. There is also an influence of broadening a main peak because a small peak does not look like a single peak. Bunching processing in which those various kinds of peak forms well are well taken into consideration is desired to be executed.

The number of pieces of virtual line calculation data generated by the above-mentioned bunching is set to from 15 points to 64 points, for example. This is in general due to, for example, the fact that 30 points to 50 points of data are preferred in many cases to accurately obtain a peak area, or 32 points to 63 points of peak formation data are desired in many cases to facilitate selection of an appropriate start point (or endpoint) by preventing a situation in which, for example, there appears a plurality of candidates of the start point due to an excessive number of data points.

More specifically, the above-mentioned peak width w is an input variable for waveform processing, which is given by predetermined calculation or input in a data processing system (chromatographic data system (CDS)), and when "0.1 minute" is input, for example, the full width at half maximum of the target peak is a reference for calculating a data point interval with reference to 0.1 minute. For example, when actual data is taken in at the sampling period of 50 ms, 0.1 minute corresponds to 6 s=6,000 ms, and the number of points of "w" is 120. In order to aggregate those points into about 30 points, the sampling period is required to be set to 200 ms, and as a result, bunching processing of aggregating four points into one data point can be executed. As can be understood from this fact, "w" is an extremely useful parameter. The bunching processing based on the input value "w" not only reduces noise, but also can assume the CDS of a peak waveform intended by an operator as preliminary processing of the waveform processing. That is, it is possible to optimize the number of data points so that those data points can easily be processed and the number thereof is not too large or too small for the CDS.

Further, for example, when the peak width serving as a reference of the peak full width is w=60 s, data points within the time interval of 1 s are summed by bunching, to thereby be able to obtain about 60 data points obtained by bunching. That is, for example, when a sampling period S of original data is S=0.4 s, and the number of data points of virtual curve calculation data of one peak is set to N (e.g., range of number of points of from 32 to 63), the number of points to be subjected to bunching is obtained by B=w/(S×N). When the value of B is not an integer, the decimal point may be rounded down, rounded up, or rounded. More specifically, when N=64 is set based on B≥W/(S×N), for example, B is a minimum integer satisfying the above-mentioned expression.

When the number of points to be subjected to bunching is obtained in this manner, a representative value, for example, an average value of measured signal intensities, is obtained for the corresponding number of pieces of plot data, to thereby be able to easily reduce an arithmetic processing load of subsequent virtual curve calculation (curve fitting) or reduce the influence of noise. In order to reduce the number of pieces of data, the representative value may not be obtained, but the plot data may be reduced. Also in this case, it is possible to reduce the arithmetic processing load.

In this case, the peak width w may be set through user input, but may automatically be set through determination based on the peak form. In the latter case, the peak width w can also be set more easily for each component.

Figure 5:
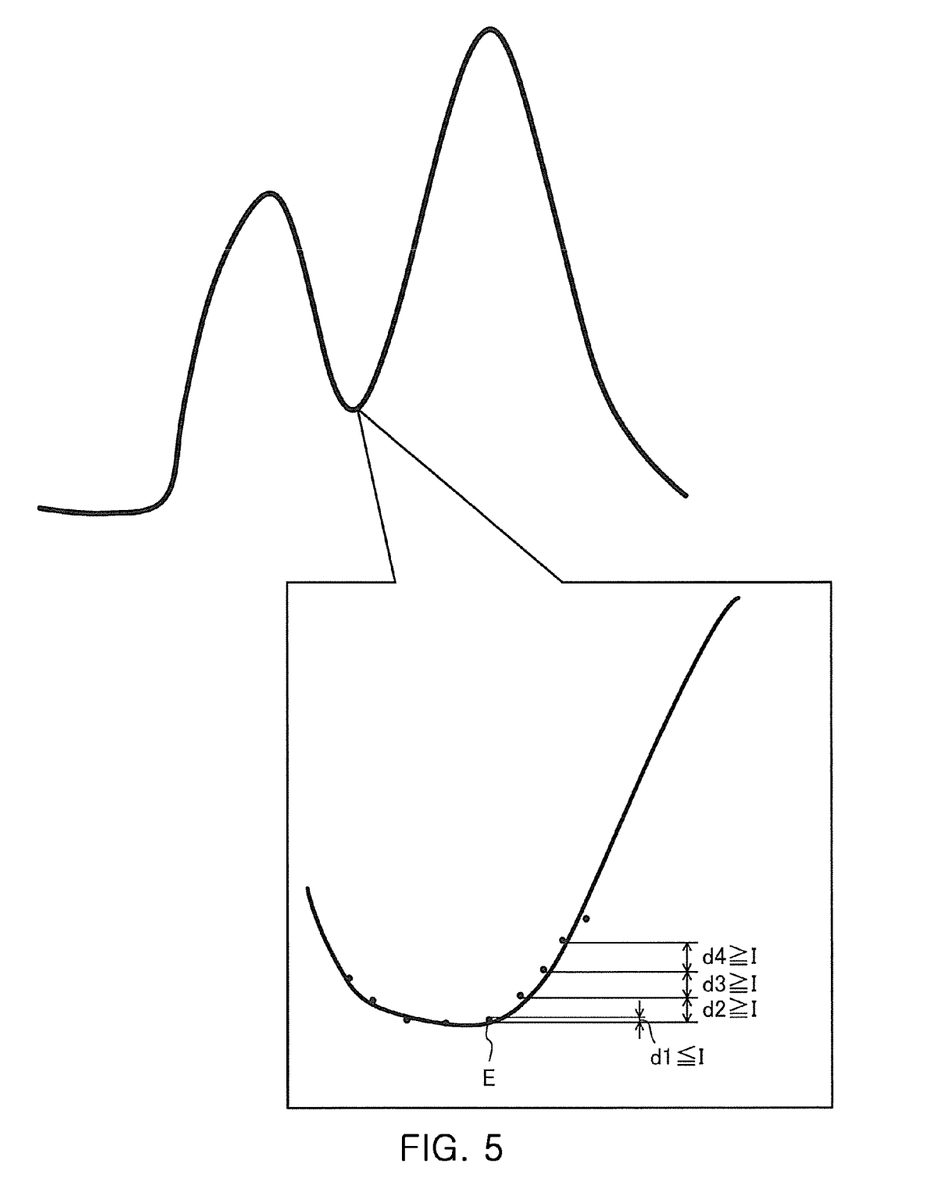
FIG. 5 is an explanatory graph for showing an example of extraction of other characteristic points.

The peak width w is temporarily obtained to obtain a predetermined number of points to be subjected to bunching, and thus is not always required to be obtained accurately compared to a case in which the peak area is obtained after the virtual curve calculation processing, for example. Specifically, the peak width w can be acquired by obtaining a provisional start point and a provisional end point in the following manner, for example. Specifically, as shown in FIG. 5, for example, in a case where differences between measured signal intensities of adjacent pieces of plot data are sequentially set to d1 to d4 and a predetermined insensitive displacement is set as I, when "d2≥I" to "d4≥I" are satisfied consecutively three times after d1≤I is satisfied, a plot E corresponding to the first d1 may be set as the start point. The end point can also be obtained in a similar manner.

Figure 6:
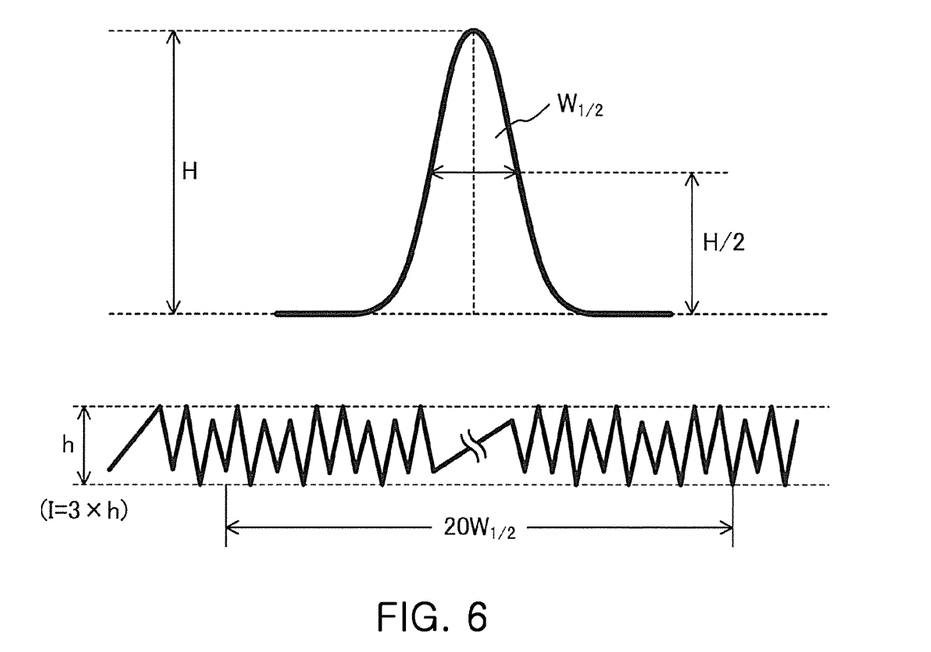
FIG. 6 is an explanatory graph for showing an example of obtaining an insensitive displacement.

The above-mentioned insensitive displacement I can also be set automatically in the following manner, for example, and as shown in FIG. 6. For example, first, a time interval, which is 20 times to 30 times the peak width $w_{1/2}$ of the full width at half maximum, is detected in a time band assumed to have no peak (no-peak section near peak, that is, a section that can be regarded as a baseline), the size (difference between maximum and minimum peaks of noise signal) of a peak-to-peak of a detection signal in the vertical axis is assumed to be the size of noise in the section, and the size is multiplied by a predetermined coefficient (e.g., 3), which is set by input in advance or the like, to thereby be able to set the insensitive displacement I (threshold value recognized as peak). The above-mentioned coefficient is not always required to be a natural number.

When, for example, a magnitude relationship may not be continuous even under a situation in which some point is required to be recognized as a start point or the like because there are an excessive number of data points or the noise is not suppressed relatively satisfactorily before the execution of bunching processing, for example, the above-mentioned repetition count or the size of the insensitive displacement I may be adjusted to be increased or decreased, to thereby set an appropriate situation with respect to elapse of time or repetition.

(Data Processing Operation-Virtual Curve Calculation Processing, and Characteristic Point Determination Processing)

When an appropriate number of pieces of virtual curve calculation data are obtained by the above-mentioned bunching processing, virtual curve calculation processing (curve fitting) or characteristic point determination processing can be executed at a relatively small arithmetic processing load. Specifically, for example, a virtual curve C, for example, a quadratic curve is obtained by a non-linear least-squares method, for example (FIG. 4). Alternatively, a hyperbolic cosine function (cos h) can also be used. In any case of those regression curves, as the number of regression coefficients becomes smaller, there is less influence of noise or outlier, which is desired. More specifically, for example, plot data of adjacent five points is applied to a quadratic function or a polynomial of three degrees or more.

Similarly to the description of the example of obtaining a provisional start point or a provisional end point based on a difference between measured signal intensities of adjacent pieces of plot data at the time of obtaining the peak width w to obtain a predetermined number of points to be subjected to bunching, the range of the virtual curve calculation data to be subjected to the virtual curve calculation processing as described above may be set by obtaining a start point and an end point based on a difference between signal intensities of the adjacent pieces of virtual curve calculation data. In this case, the number of points of virtual curve calculation data is expected to be appropriate due to bunching processing, and the detection signal noise in the vertical direction is expected to be suppressed relatively satisfactorily compared to the original data, and thus it is possible to easily calculate the virtual curve that depends on an appropriate start point and end point.

That is, it is easy to distinguish between a baseline region and a peak region by using the insensitive displacement I, and thus it is possible to cut out a peak region prior to the virtual curve calculation processing, and execute the virtual curve calculation processing only for data points of the peak region. For example, when a start point is detected in determination at the repetition count of three times, past data points of the first and second determinations may also be used for the virtual curve calculation processing. The end point can also be detected in a similar manner, and then past data points can be established to be used for the virtual curve calculation processing (considering transition of past signals). Further, the method of using the insensitive displacement I can also be applied to quantization of the detection signal in the vertical axis (reference for determining effective number). The advantage of this application is to simplify data points to be used for the virtual curve calculation processing. Further, this quantization is also effective for the display or producing a printed matter.

Figure 7:
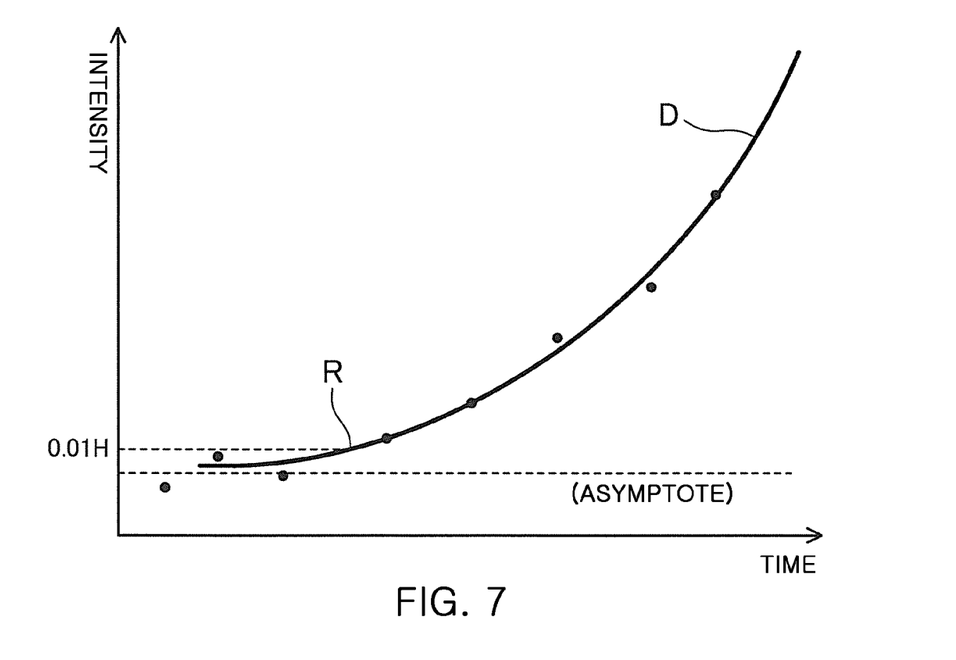
FIG. 7 is an explanatory graph for showing an example of extraction of still other characteristic points.

Further, when characteristic points such as the start point and the end point are obtained based on the virtual curve acquired by the virtual curve calculation processing, plot data of adjacent seven points is applied to a hyperbolic function (inverse proportional function) $f(t)=a/(t-b)+c$ (e.g., D of FIG. 7). The regression function can also be estimated by a polynomial of four degrees or more, but as the number of regression coefficients increases, there is a larger influence of noise or the like, and a sum of actual data points to be subjected to regression is required to be increased. Originally, there is a smaller influence of the outlier or the like as the number of regression coefficients is smaller. The background of this regression is a premise that the peak waveform being a natural phenomenon has a high possibility of being a simple curve. Further, the exponential decay function is a non-linear function, but a Gaussian function, an exponentially modified Gaussian (EMG) function, and other functions can also be used. When a plurality of peaks and the like are adjacent, the characteristic length, section, and number of points of a representative peak in the time-axis direction, for example, the input peak width w of the full width at half maximum, are set in advance or later to execute fitting. That is, the number of actual data points for regressing the virtual line is determined based on the input (given) peak width, for example.

Further, when an exponential function is used to execute regression for the asymptotic virtual curve calculation processing, a linear expression may be used to execute regression based on logarithmic calculation data using logarithmic calculation. For example, $f(t)-C=\alpha e^{(t-T)/\tau}$ can be simplified and represented by $f(t)-C=Ae^{t/\tau}$, where A and C represent regression coefficients and τ represents a time constant (as t decreases by τ, α attenuates to 1/e thereof).

At this time, when logarithms of both sides are taken, $\log\{f(t)-C\}=\log A+t/\tau$ is obtained, and thus the right side can be regressed by a linear expression of t, which has a slope of 1/τ and an intercept of log A, by regarding a straight baseline as a horizontal asymptote y=C.

Further, non-linear virtual curve calculation processing having C as the regression coefficient can also be executed. For example, when $f(t)-C=Ae^{((t-tr)^2)/2\sigma^2}$ is simplified to be represented by $f(t)-C=Ae^{(a_0+a_1 \times t+a_2 \times t^2)}$ and logarithms of both sides are taken, $\log\{f(t)-C\}=\log A+a_0+a_1 \times t+a_2 \times t^2$ and $\log\{f(t)-C\}=a_0'+a_1 \times t+a_2 \times t^2$ are obtained. Thus, the logarithm value $\log\{f(t)-C\}$ of the chromatogram waveform $\{f(t)-C\}$ through which the baseline is drawn can be regressed by using a quadratic function of the time t, to thereby easily search for the start point and the end point.

Further, a square root of the plot data can also be taken and regressed by a straight line for a quadratic curve with the same approach.

$$y-C=(t+R)^2 \text{ and } SQRT(y-C)=t+R$$

Further, an inflection point may be used as the characteristic point of a shoulder peak. In this case, regression analysis can be executed to obtain a polynomial of three degrees or more or a hyperbolic function. This cubic polynomial does not have an extreme value, but has an inflection point.

The coordinates of, for example, an origin O of a virtual curve C (FIG. 4) as described above can be obtained relatively easily by an algebraic operation or other operations in many cases. Specifically, for example, when the virtual curve is represented by a quadratic curve of $f(t) = at^2+bt+c$, a temporal coordinate value of the origin O is given by $-b/2a$.

Further, in the case of a virtual curve D (FIG. 7) of an inverse proportional, for example, a provisional start point (e.g., R of FIG. 7) and a provisional end point may be detected on the left and right sides, respectively, based on the provisional baseline and the provisional peak point by setting the provisional height of a peak i as H and multiplying i by 0.01, which can be set in advance or can be set later, to obtain 0.01H as the threshold value.

Further, when the virtual curve is represented by a cubic curve of $f(t)=at^3+bt^2+ct+d$, a temporal coordinate value tI of a shoulder point S is given by $-b/3a$. Further, it may be detected that an amount of change between adjacent data points is equal to or smaller than the threshold value. In this case, at the time of regression analysis, a discriminant of a quadratic curve may be used to confirm the fact that there are less than two real solutions (monotonously increasing or monotonously decreasing), and advancing the processing of obtaining a provisional characteristic point. Alternatively, when there are significantly two real solutions at the time of regression, general peak point detection processing may be executed. Further, regression may be executed under a constraint condition relating to coefficients a, b, c, and d so as to narrow down to a cubic regression expression having one real solution. Further, in a case where the temporal coordinate value of an inflection point serving as a shoulder point has a high possibility of being appropriately obtained even in the case of two real solutions, even when the virtual curve itself does not always fit a most appropriate curve, the provisional shoulder point may be obtained based on the inflection point. Further, setting of a section in regression analysis is specification of a term table for waveform processing. At the time of automatic execution, for example, a provisional holding period tR and the input peak full width at half maximum w may be used to set tR−2w to tR−¼w as the section, and execute regression analysis. In this case, the above-mentioned section tR−2w to tR−¼w is required to have a flexibility, and in particular, it is desired to set the section so as not to be influenced by close adjacent peaks.

Further, the Savitzky-Golay method may be used for a derivative coefficient determination method of the regression curve to temporarily obtain virtual characteristic points such as the start point, the end point, the valley point, the peak point, and the shoulder point. That is, the Savitzky-Golay method is also effective for calculating the derivative coefficient, and is able not only to obtain a regression coefficient, but also to determine the derivative coefficient of a polynomial. Thus, this derivative coefficient may be used to obtain each virtual characteristic point.

(Extraction of Characteristic Point of Actual Plot Data)

Coordinates of the origin O or the like obtained in the above-mentioned manner are usually coordinates of a virtual point. Thus, characteristic points obtained based on, for example, the virtual curve C or the like in this manner are set as provisional characteristic points to extract and select characteristic points of the plot data based on the measured plot data. Specifically, for example, plot data (e.g., plot data P) closest to the provisional characteristic point in terms of time, plot data closest to the provisional characteristic point in terms of distance, plot data (e.g., plot data Q) that takes an extreme value in the neighborhood of the provisional characteristic point, for example, within a predetermined time range, or a point having the smallest gradient among adjacent pieces of plot data is extracted and selected as the characteristic point of the actual plot data.

That is, it is possible to associate actual data points with various kinds of virtual characteristic points based on a predetermined rule, for example, a rule of selecting a piece of plot data closer to the provisional characteristic point in terms of time. This logic is the gist of the present invention, and in addition to the rule of selecting a piece of plot data having a shorter time among two time points, a rule of selecting a piece of plot data having an earlier time point or a later time point is conceivable. Further, a rule of considering information on a two-dimensional chromatogram in the vertical direction (detection intensity) is also conceivable. The characteristic point of plot data obtained in the above-mentioned manner is likely to be a characteristic point or a point closest to the characteristic point among actually measured pieces of plot data, and thus it is expected to obtain coordinate values of an appropriate characteristic point. Further, compared to the provisional characteristic point based on the virtual curve, it is possible to reduce an influence of other plot data, for example, distant plot data. Thus, it is possible to easily improve the detection accuracy by executing qualitative processing using the above-mentioned characteristic point of plot data, setting the baseline, or executing quantitative processing. Further, even when a blank sample is not prepared, for example, a line segment connecting between the characteristic points of plot data can also be set as the baseline to execute the quantitative processing, for example. Further, even in a case where there is blank data, when there is a large influence of noise on the blank data, for example, it is also possible to execute more accurate processing by using the characteristic point of plot data. Further, it is possible to execute more accurate processing also when the valley point does not decrease to the base line with use of a blank sample.

(Other Matters)

In the above-mentioned example, the description has been given of the liquid chromatograph as an example. However, the chromatograph is not limited to the liquid chromatograph, and similar processing can be applied to various kinds of chromatographs.

Further, the technology of using the provisional characteristic point and the characteristic point of plot data as described above does not exclude a general technology of directly obtaining the characteristic point based on the virtual curve, and those technology and the technology of the present invention may be used in a selective manner. Further, analysis results obtained by those various kinds of technologies may be displayed in a comparable manner.

Now, a description is given of a difference in usage between "time point" and "time". The "time point" represents each point in time of a clock that advances as time passes by. The time point has a defined origin, namely, 0. For example, a point in time like "16:10:10 on Apr. 1, 2020" is the time point. Meanwhile, the "time" represents a length of time, and is a period or difference between a time point A and a time point B, such as 10 seconds or 1.2 minutes. The holding time is also one kind of time.

Further, in addition to such bunching processing as described above, it is also possible to use the processing of subtracting a blank and/or removing a drift prior to each processing.

What is claimed is:

1. A data processing device at a chromatograph comprising a chromatograph unit configured to separate components contained in a sample to measure the separated components,
wherein the data processing device comprises an arithmetic processor configured to execute data processing based on plot data measured by using the chromatograph and
a display configured to display a processing result obtained by the data processing device, wherein the arithmetic processer is configured to obtain a smaller number of pieces of virtual curve calculation data than a number of pieces of the measured plot data and a virtual curve based on the virtual curve calculation data and
wherein the arithmetic processer is configured to obtain a provisional characteristic point based on the obtained virtual curve and extract a characteristic point of the plot data corresponding to the provisional characteristic point among pieces of plot data which are actually measured by the chromatograph.

2. The data processing device according to claim 1, wherein the arithmetic processor is configured to obtain a representative value for each predetermined number of pieces of plot data, and set the representative value as the virtual curve calculation data.

3. The data processing device according to claim 2, wherein the arithmetic processor is configured to obtain a provisional start point and a provisional end point for each peak waveform in a measurement result of the chromatograph,
wherein the arithmetic processor is configured to set, for each peak waveform, the predetermined number of pieces of plot data so that a number of pieces of the virtual curve calculation data between the provisional start point and the provisional end point falls within a predetermined range, which is set in advance.

4. The data processing device according to claim 3, wherein the arithmetic processor is configured to obtain the provisional start point and the provisional end point based on a difference in measured signal intensity between adjacent pieces of plot data.

5. The data processing device according to claim 1, wherein the arithmetic processor is configured to obtain a start point and an end point based on a difference in signal intensity between adjacent pieces of virtual curve calculation data.

6. The data processing device according to claim 1, wherein the arithmetic processor is configured to obtain the virtual curve based on logarithm calculation data obtained by executing logarithm calculation using the virtual curve calculation data.

7. A data processing method for a chromatograph, for executing data processing, the data processing method comprising:
measuring, by the chromatograph, plot data based at least in part on a sampling period of a detector of the chromatograph;
obtaining, by an arithmetic processor of the chromatograph, a smaller number of pieces of virtual curve calculation data than a number of pieces of the measured plot data based at least in part on measuring the plot data;
obtaining, by the arithmetic processor, a virtual curve based on the virtual curve calculation data;
obtaining, by the arithmetic processer, a provisional characteristic point based on the obtained virtual curve,
extracting, by the arithmetic processer, a characteristic point of the plot data corresponding to the provisional characteristic point among pieces of the plot data which are actually measured by the chromatograph; and
displaying a processing result using the virtual curve through a display of the chromatograph.

* * * * *